(12) United States Patent
Jensen et al.

(10) Patent No.: US 10,358,861 B2
(45) Date of Patent: Jul. 23, 2019

(54) VACUUM INSULATED GLAZING UNIT

(71) Applicant: VKR Holding A/S, Hørsholm (DK)

(72) Inventors: Carsten Jensen, Horsens (DK);
Thibault De Rycke, Svendborg (DE)

(73) Assignee: VKR HOLDING A/S, Hørsholm (DK)

( * ) Notice: Subject to any disclaimer, the term of this patent is extended or adjusted under 35 U.S.C. 154(b) by 0 days.

(21) Appl. No.: 15/899,576

(22) Filed: Feb. 20, 2018

(65) Prior Publication Data
US 2018/0238103 A1    Aug. 23, 2018

(30) Foreign Application Priority Data

Feb. 17, 2017    (DK) .................................. 2017 70112

(51) Int. Cl.
*E06B 3/66*     (2006.01)
*E06B 3/673*    (2006.01)
*E06B 3/677*    (2006.01)

(52) U.S. Cl.
CPC .......... *E06B 3/6612* (2013.01); *E06B 3/6736* (2013.01); *E06B 3/6775* (2013.01); *E06B 3/67334* (2013.01); *Y02A 30/25* (2018.01); *Y02B 80/24* (2013.01)

(58) Field of Classification Search
CPC .. E06B 3/6612; E06B 3/67334; E06B 3/6736; E06B 3/6775
See application file for complete search history.

(56) References Cited

U.S. PATENT DOCUMENTS

| 6,383,580 | B1 | 5/2002 | Aggas | |
| 2006/0154008 | A1* | 7/2006 | Suzuki | ...................... H01J 7/22 428/34.4 |
| 2009/0313946 | A1 | 12/2009 | Guo | |
| 2012/0148795 | A1 | 6/2012 | Kwon | |
| 2013/0059087 | A1 | 3/2013 | Veerasamy | |

(Continued)

FOREIGN PATENT DOCUMENTS

| AT | 14327 U1 | 8/2015 |
| EP | 1422204 A1 | 5/2004 |

(Continued)

OTHER PUBLICATIONS

Machine translation of KR 20130109754; Jung et al. Seal Composition for Exhaust Pipe of Vacuum Glazing (Year: 2013).*

(Continued)

*Primary Examiner* — Queenie S Dehghan
(74) *Attorney, Agent, or Firm* — Cantor Colburn LLP

(57) ABSTRACT

The present disclosure relates to a method of producing a vacuum insulated glazing (VIG) unit, a VIG unit produced by means of the method and a bonded assembly for providing to an evacuation hole in a glass pane of a VIG unit, where an evacuation tube has an outer diameter (Dtube) which is less that the smallest internal diameter of the evacuation hole, the method including providing a support a supporting structure over an evacuation hole in a glass pane of the VIG unit, and a proximal end of the evacuation tube rests on the supporting structure so that the position of the evacuation tube in the direction perpendicular to the outer surface of the first pane is defined by the supporting structure, and so that the proximal opening of the evacuation tube is in correspondence with the evacuation hole.

10 Claims, 16 Drawing Sheets

(56) References Cited

U.S. PATENT DOCUMENTS

| | | | |
|---|---|---|---|
| 2013/0059160 A1 | 3/2013 | Veerasamy | |
| 2013/0305785 A1 | 11/2013 | Dennis | |
| 2015/0218032 A1* | 8/2015 | Hogan | E06B 3/6612 |
| | | | 428/34 |
| 2015/0218877 A1 | 8/2015 | Kawahara | |
| 2015/0223619 A1* | 8/2015 | Artwohl | E06B 3/6612 |
| | | | 428/69 |
| 2016/0174734 A1* | 6/2016 | Artwohl | A47F 3/005 |
| | | | 428/34 |

FOREIGN PATENT DOCUMENTS

| | | |
|---|---|---|
| KR | 20130109754 A | 10/2013 |
| WO | 0041980 A1 | 7/2000 |
| WO | 0227135 A1 | 4/2002 |
| WO | 2016027750 A1 | 2/2016 |
| WO | 2016144857 A1 | 9/2016 |
| WO | 2016197199 A1 | 12/2016 |

OTHER PUBLICATIONS

European Search Report for corresponding application EP 18 15 6518; Report dated Jun. 14, 2018.
Danish Search Report for corresponding application PA 2017 70112; Report dated Aug. 15, 2017.

* cited by examiner

VACUUM INSULATED GLAZING UNIT

CROSS REFERENCE TO RELATED APPLICATION

This application is related to and claims the benefit of Denmark Patent Application Number PA201770112 filed on 17 Feb. 2017, the contents of which are incorporated herein by reference in their entirety.

TECHNICAL FIELD

The present disclosure relates to a method of producing a vacuum insulated glazing (VIG) unit, a VIG unit and a bonded assembly for providing to an evacuation hole in a glass pane of a VIG unit.

BACKGROUND

When manufacturing vacuum insulated glazing (VIG) units, a sealable closure of the evacuation hole into the void formed inside the units between the parallel glass panes of it is provided, typically in the form of a soldering material that is heated to form a gas tight seal around an evacuation tube through which the void is evacuated, after which the outer tip of the tube is sealed off to effectively close the access to the void. Such methods are disclosed in e.g. EP 1 422 204 and in US 2012/148795, where the evacuation hole is manufactured as a stepped hole where a glass tube is inserted in the upper and wider part of the hole and is resting on the horizontal annulus separating the upper part of the hole from the lower part, which has a diameter being less that the diameter of the glass tube. After the seal is formed around the glass tube and the void has been evacuated, the distal tip of the glass tube is heated to its melting point to form a closure of the glass tube and thereby to seal off the evacuated void.

BRIEF DESCRIPTION

For a number of different applications, it is preferred that the inner diameter of the evacuation hole exceeds the outer diameter of the evacuation tube, in particularly in VIG units where the panes of glass are made from tempered glass. As a rule of thumb, the inner diameter of a through-hole in a pane of glass to be tempered for mounting of load-bearing connections to the pane, such as hinges or for suspension of the glass pane, should be at least equal to the thickness of the pane in order to ensure that the tempering of the glass is correctly executed throughout the pane including the areas close to the hole. It has been found by the present inventors that the same practice should be followed for the evacuation hole in a pane of the VIG unit although the hole by no means will be load bearing, as the risk of formation and growth of cracks near the evacuation hole will increase over time if the diameter of the evacuation hole is significantly smaller than the thickness of the pane, leading to a reduced durability of the VIG unit as the cracks will tend to reduce the vacuum in the void and thus the insulating effect of the VIG unit. Thus, in order to increase the durability of the VIG unit, the diameter of the evacuation hole should be at least the same as the thickness of the pane in which the evacuation hole is formed, which normally is at least 3 millimeters but preferably at least 4 millimeters in order to be able to withstand the pressure difference between the evacuated void and the ambient atmospheric pressure. However, the evacuation tube should have a diameter less than that, preferably at the order of 2 millimeters, if the tube is to be sealed off after evacuation of the void by melting of the distal tip of the tube in a so-called tip off, as a larger diameter of the tube would require an amount of heating that could compromise the durability of the glass pane near the evacuation hole and in particularly compromise the possible tempering of the glass pane near the evacuation hole and/or the tube sealing that provides a gas tight seal between the evacuation tube and the pane.

With the term tempered glass pane is herein understood glass panes in which compressive stresses have been introduced in the surface of the glass pane, and the center of the glass pane consequently is subject to tensile stress. For glass to be considered tempered this compressive stress on the surface of the glass should be a minimum of 69 MPa (10,000 psi) and is usually higher than 95 MPa and up to about 150 MPa.

Tempered glass, also known as toughened glass, may be produced from annealed glass by means of a strengthening procedure, which e.g. may be a heat tempering, a chemically tempering or plasma tempering with the purpose of introducing the compressive stresses into the surfaces of the glass pane. Other types of tempering of glass include ion treatment or bombardment of the glass pane surfaces with large atoms, which becomes embedded in the surface deposition of material on the glass pane surface by means of surface treatment or bombardment and surface chemical reactions for obtaining the compressive stresses at the glass pane surface.

Thermally tempered glass may be produced by means of a furnace in which the annealed glass is heated to a temperature of approximately 700° C., after which the glass pane is rapidly cooled. The cooling introduces the compressive stresses into the glass pane surface.

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions which cause the material at the glass pane surfaces to be in a compressed state.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

After tempering, the stress pattern developed by the glass is high, and the mechanical strength of tempered glass is typically four to five times higher than that of annealed glass.

The difference in diameter between the evacuation tube and the evacuation hole is not a problem when it comes to providing the tube sealing, as a soldering material placed at the top of the pane around the evacuation tube will fill the space between the tube and the evacuation hole when heated and subsequently cooled to form a tube sealing, whether or not the tube is partly or wholly inserted into the evacuation hole or is held atop of the hole. The problem appears to be the positioning of the distal tip of the evacuation tube in the direction perpendicular to the surface of the glass pane, which may vary and is less precise that with e.g. a stepped evacuation hole, where the evacuation tube rests on the horizontal annulus separating the upper part of the hole from the lower part, which has a diameter being less that the outer diameter of the glass tube as discussed previously referring to the prior art. A less precise positioning of the distal end of the evacuation tube means that the source of heating of the distal end for tipping off of the evacuation tube has to be arranged with a larger distance to the distal end of the evacuation tube to accommodate for the larger tolerance in the position of the distal end so as to avoid a situation where the heating element collides with the distal end of the evacuation tube when placed above it for the tipping off. A larger distance between the heating element and the distal end of the evacuation tube increases the risk that the heat radiation from the heating element may harm the tube seal, because the distal end of the evacuation tube will shield off less of the total heat radiation from the heating element with larger distance between the two. The tube seal may partly evaporate and/or become brittle or porous due to the heat radiation from the heating element which may reduce the durability of the tube seal and thus of the VIG unit itself as the insulating properties of the VIG unit depends on the state of vacuum in the void.

In order to ensure a precise positioning of the distal end of the evacuation tube with respect to the outer or upper surface of the glass pane in which the evacuation hole is provided and thereby allow for a shorter distance between distal end of the evacuation tube and the heating element for tipping off the evacuation tube after evacuation of the void and thereby reduce the above-identified drawbacks, a supporting structure is provided between the pane and the evacuation tube, which is sufficiently shape-stable during the procedure steps up to and including the tipping off.

Thus, the present disclosure relates in a first aspect to a method of producing a vacuum insulated glazing (VIG) unit comprising the steps of:
  providing first and second substantially parallel panes of glass, preferably comprising tempered glass, a plurality of pillars, and a peripheral seal between the first and second panes;
  providing an evacuation hole in an outer surface of the first pane for evacuating a void formed between said panes through the evacuation hole to a pressure less than atmospheric pressure;
  providing on the first pane a supporting structure, an evacuation tube and a tube soldering material such that the supporting structure rests on the first pane and extends over the evacuation hole and a proximal end of the evacuation tube rests on the supporting structure so that a position of the evacuation tube in a direction perpendicular to an outer surface of the first pane is defined by the supporting structure and so that a proximal opening of the evacuation tube is in correspondence with the evacuation hole, the evacuation tube having an outer diameter which is less that a smallest internal diameter of the evacuation hole;
  heating the tube soldering material to a condition where the tube soldering material will flow, while maintaining the evacuation tube, the supporting structure and the first glass pane substantially stationary,
  subsequently cooling the tube soldering material to a solid condition so as to provide a gastight tube seal preventing passage of gas through the evacuation hole except via the evacuation tube, and so that the tube seal material bonds to the evacuation tube;
  evacuating the void through the evacuation hole and the evacuation tube; and
  heating a distal tip of the evacuation tube so as to seal the evacuation tube.

The pillars are provided for ensuring a distance between the inner surfaces of the two panes in the order of 0.2 millimeters. Such high-strength pillars or spacers are well known in the prior art from e.g. WO 2016/027750 and WO 2016/144857 and may be provided as a glass frit paste that is printed onto the inner surface of one of the two panes and subsequently heated to form the pillars as shown in e.g. AT 14327 U.

The peripheral seal provided between the first and second panes, may preferably be made from a soldering material containing glass solder frit with a low melting temperature, which by means of a thermal treatment is turned into a gas tight peripheral seal as known from e.g. WO 02/27135 and EP 1 422 204. Alternatively, other materials may be employed, such as a metal band seal as disclosed e.g. in US 2015/218877.

The void between the panes is preferably evacuated to a vacuum with a pressure of 0.001 millibar or less in order to ensure a suitable insulating effect of the VIG unit.

The tube soldering material may a glass solder frit paste with a low melting temperature, where the paste further comprises of about 70 wt %, an organic binder, inorganic fillers and solvents, for example water or alcohol. Such paste is well known from the prior art. Alternatively, the tube soldering material may be a solid entity, e.g. in the form of a solid disc comprising a low melting glass solder frit, which is also well-known in the art. The tube soldering material may be provided as a combination of two different materials comprising glass solder frit with different thermal expansion coefficients that are adjusted to correspond to the thermal expansion coefficients of the parts they will bond to, i.e. to the pane and the evacuation tube, respectively, as e.g. known from WO 00/41980. As an alternative, the tube soldering material may comprise a metal alloy with a melting point sufficiently low, such as in the range of 300 to 360° C. so that the tube soldering material can be heated to a flowing state to form the tube seal without having an excessive adverse effect on the tempering of the first pane.

Generally, the tube soldering material should have properties to be able flow to form the tube seal at a temperature in the range of 150 to 550° C., preferably in the range of 300 to 400° C.

The supporting structure preferably comprises a metal or a metal alloy, preferably selected from titanium, stainless steel, nickel plated copper and an iron-nickel-cobalt alloy. The alloy has preferably a nominal composition, by weight, of about 29% nickel, 17% cobalt and the balance iron. This alloy is commonly referred to by the trademark Kovar, other trademarks associated therewith include Sealvar, Nilo-K, and Therlo. Suitable alloys with similar, but not identical, compositions include Fernico (28 Ni, 18 Co) and Rodar (0.30 Mn). These materials have thermal expansion coefficients that match those of the first glass pane to an extent that is agreeable with a sufficient durability of the sealing of the evacuation hole. Of these, titanium is preferred for its excellent match in thermal expansion coefficient with that of glass. In an alternative, the supporting structure is made from a glass material, such as a sheet of glass. The thickness of the supporting structure is preferably in the range of 0.3 to 0.8 millimeters.

The supporting structure may in a preferred example comprise a first structure configured for engaging with the evacuation hole so as to ensure a correct horizontal positioning of the supporting structure with respect to the evacuation hole and/or with a second structure which is configured to engage with the evacuation tube so as to ensure a correct horizontal positioning of the evacuation tube with respect to the supporting structure. The first and second structure may be provided by the molding of the supporting structure or by embossing the (metal) supporting structure.

Alternatively, the first and/or second structure may be provided by soldering, welding or gluing the structure(s) to a flat element of the supporting structure.

It is preferred that the tube seal bonds to the first pane in a pattern that encloses the evacuation hole so as to provide a gas proof seal between the first pane and the evacuation tube. Alternatively, another sealing element can be provided, e.g. between the supporting structure and the first pane, so that it is sufficient that the tube seal bonds to the supporting structure and to the evacuation tube.

It is preferred that the thermal expansion coefficient of the supporting structure is substantially the same as for the tube seal and/or substantially the same as for the first pane, which means within 20% of each other, preferably within about 10%.

The supporting structure is preferably maintaining substantially the same position of the evacuation tube and the outer surface of the first pane during said heating and cooling of the tube soldering material to form the tube seal.

The evacuation tube is made from glass as the thermal expansion coefficient of a glass evacuation tube will closely match that of the upper glass pane, which provides for smaller mutual tensions due to temperature variations and thus for an improved durability of the VIG unit.

The supporting structure is preferably provided in the form of a perforated foil, wherein the perforation allows for passage of gas between the evacuation hole and the evacuation tube.

The thickness of the first pane is preferably in the range of 3 to 6 millimeters and the thickness of the second pane is preferably within the same range.

The smallest internal diameter of the evacuation hole is preferably at least 2.5 millimeters, more preferred in the range of 3.5 to 8 millimeters.

The tube soldering material may in a preferred example be provided in the form of a solid pre-form of glass solder frit with a central opening provided therein for accommodating the evacuation tube. The tube soldering material may in particular be provided in a disc-shape.

The evacuation tube and the supporting structure are in a preferred version provided as a single unit in the same material.

The tube soldering material comprises in a preferred example a low-melting temperature glass solder frit and is more preferred also substantially lead-free.

In a second aspect, the present disclosure relates to a vacuum insulated glazing unit comprising:
  first and second substantially parallel panes of glass, preferably comprising tempered glass, a plurality of pillars and a peripheral seal provided between the first and second panes, wherein an evacuation tube extends from an outer surface of the first pane, a distal end of the evacuation tube being sealed off and a proximal end of the evacuation tube being in correspondence with an evacuation hole provided in the first pane;
  a gastight tube seal bonded to the first pane and the evacuation tube so as to prevent passage of gas through the evacuation hole to the void between the first and second panes except through the evacuation tube; and
  a supporting structure supporting on the first pane and in abutment with the proximal end of the evacuation tube, the supporting structure being shape-stable at a melting point of a material forming the tube seal.

The vacuum insulated (VIG) unit according to the second aspect may optionally comprise the features discussed above with respect to the method according to the present disclosure.

Also, the supporting structure of the vacuum insulated glazing (VIG) unit is preferably in abutment with the first pane as well as the proximal end of the evacuation tube.

The tube seal bonds in a preferred example of the present disclosure to the first pane in a pattern that encloses the evacuation hole so as to ensure a gas tight sealing.

The thermal expansion coefficient of the supporting structure is preferably substantially the same as for the tube seal so as to prevent the formation of cracks or stress concentrations that may weaken the sealing of the evacuation hole.

Likewise, it is preferred that the thermal expansion coefficient of the supporting structure is substantially the same as for the first pane.

Furthermore, the present disclosure relates to a window comprising a vacuum insulated glazing (VIG) unit according to the second aspect of the present disclosure enclosed in a frame.

In a third aspect of the disclosure, it relates to a bonded assembly for an evacuation hole of a glass pane of a vacuum insulated glazing (VIG) unit, the assembly comprising
a supporting structure, an evacuation tube and a solid pre-form of tube soldering material with a central opening provided therein for accommodating the evacuation tube, wherein a proximal end of the evacuation tube abuts the supporting structure and the pre-form of tube soldering material is disposed on top of the supporting structure with the evacuation tube extending through the central opening of the pre-form of tube soldering material,
wherein the supporting structure is adapted for resting on a pane of the vacuum insulated glazing (VIG) unit and has an extent perpendicularly to the evacuation tube of at least 3.5 millimeters, preferably in the range of 5 to 10 millimeters, wherein the supporting structure allows for passage of gas through the evacuation tube, and
wherein the supporting structure is shape-stable at the melting point of the material of the tube soldering material.

The bonded assembly may optionally comprise the relevant technical features discussed previously with respect to the method and the vacuum insulated (VIG) unit according to the second aspect of the present disclosure.

BRIEF DESCRIPTION OF FIGURES

Examples of the present disclosure are shown in the enclosed drawing of which

The examples shown in the figures are not to scale and are to be regarded as sketches demonstrating the principles of the examples of the present disclosure.

DETAILED DESCRIPTION

Figure 1:
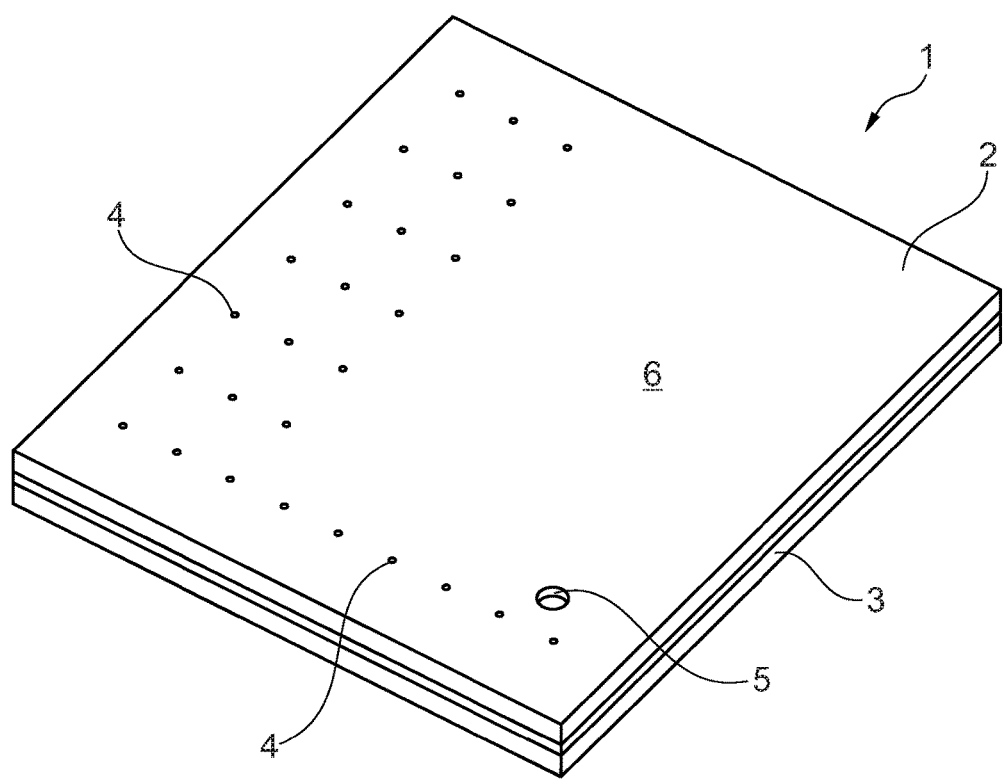
FIG. 1 is a view in perspective of a vacuum insulated glazing (VIG) unit.

The vacuum insulated glazing (VIG) unit 1 of FIG. 1 comprises two parallel panes 2, 3 of tempered glass with a plurality of pillars 4 arranged between the two panes 2, 3 in order to provide a separation of the panes 2, 3 in the order of 0.2 millimeters. The periphery between the panes 2, 3 is provided with a gas proof sealing so that the void 7 formed between the two panes 2, 3 may be evacuated to a vacuum in the order of 0.001 millibar or even less. An evacuation hole 5 is provided in the upper surface 6 of the first pane 2 and through the pane 2 for evacuation of the void 7.

In order to be able to seal off the evacuation hole 5 after evacuation of the void 7, the first pane 2 is provided with a supporting structure 8, an evacuation tube 9 and a tube soldering material 10 as shown in FIGS. 2 to 8. The supporting structure 8 rests on the first pane 2 and extends over the opening 10 of the evacuation hole 5 in the upper surface 6 of the first pane 2. The proximal end 11 of the evacuation tube 9 rests on the supporting structure 8 so that the position of the evacuation tube 9 in the direction perpendicular to the upwardly-facing outer surface 6 of the first pane 2 is defined by the supporting structure 8. The proximal opening 12 of the evacuation tube 9 is in correspondence with the evacuation hole 5 so that evacuation of the void 7 via the opening of the evacuation tube is enabled.

The evacuation tube 9 has an outer diameter Dtube of about 2 millimeters, which is less that the smallest internal diameter d1 of the evacuation hole 5. The smallest diameter d1 of the evacuation hole 5 is defined by the fact that the pane 2 is tempered glass of a thickness t1 of normally at least 4 millimeters in order to be able to withstand the pressure difference between the atmospheric pressure on the outside and the vacuum in the void 7. As mentioned previously, the inner diameter of the through-hole in a pane of glass that is to be tempered should be at least equal to the thickness t1 of the pane in order to ensure that the tempering of the glass is correctly executed throughout the pane including the areas close to the hole for the VIG unit to be durable.

Figure 2:
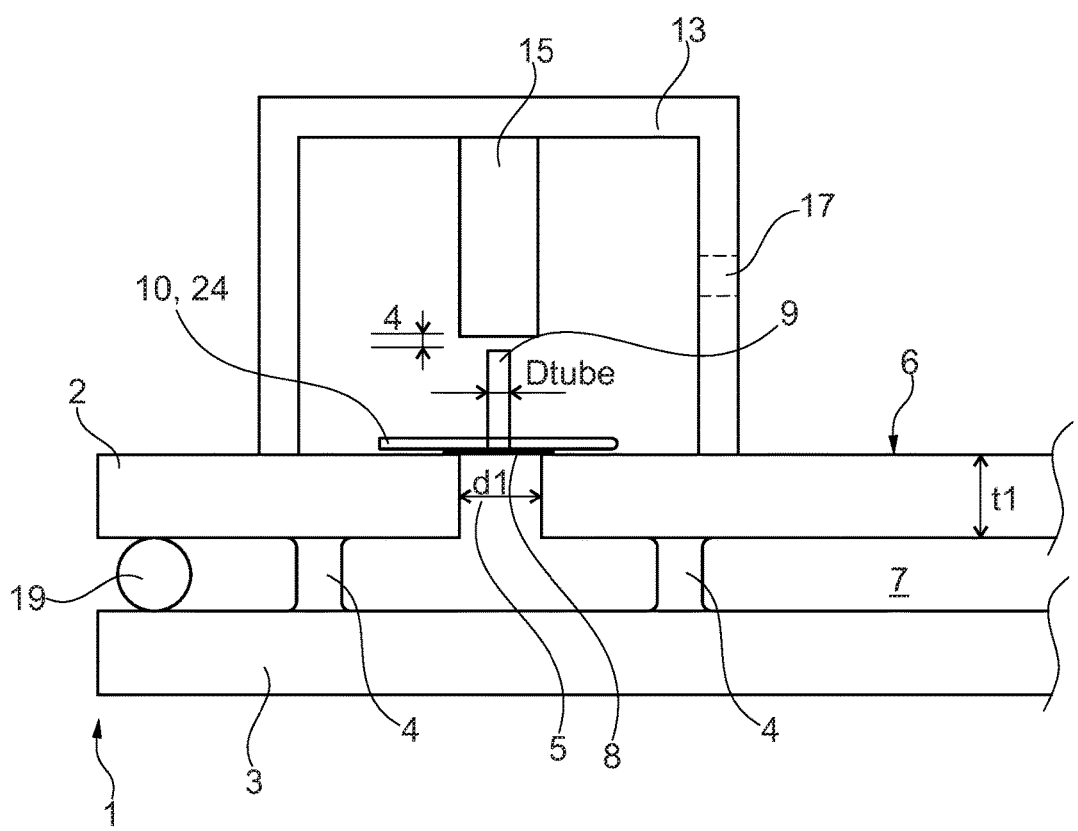
FIG. 2 is a cross-sectional view of a first example of the disclosure before the tube soldering material has been heated.
Figure 3:
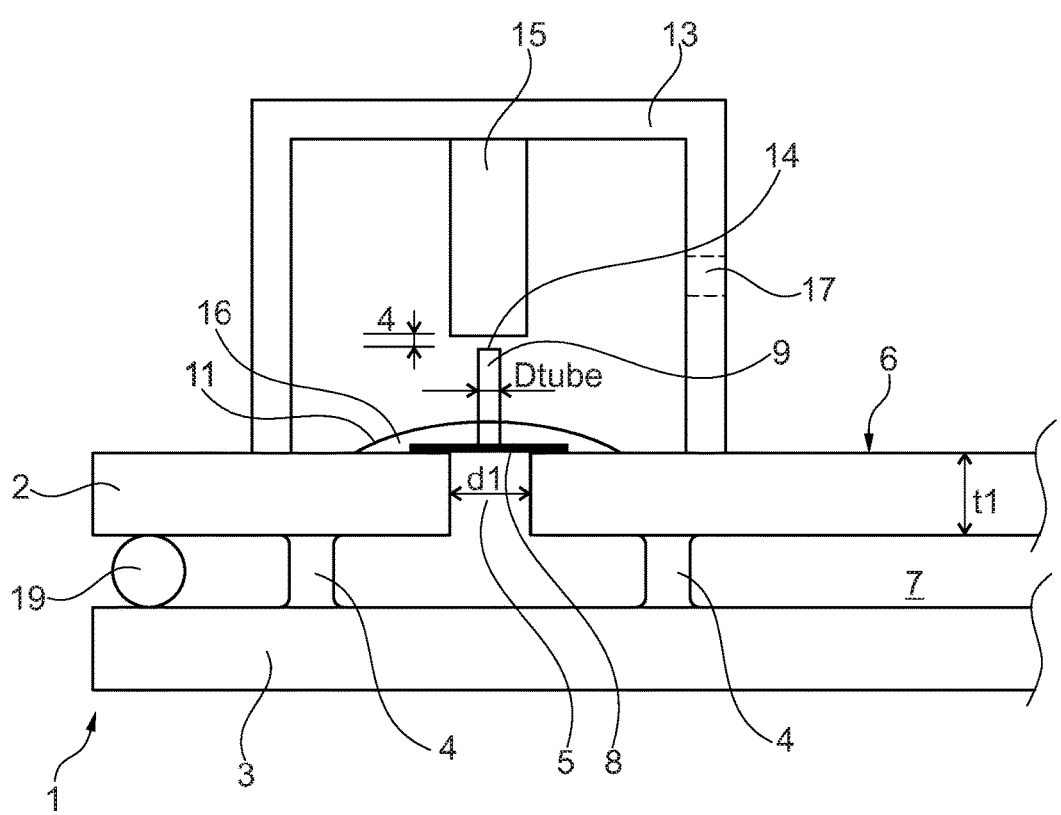
FIG. 3 is a cross-section of the example of FIG. 2, wherein the tube soldering material has been heated to form a tube seal.
Figure 4:
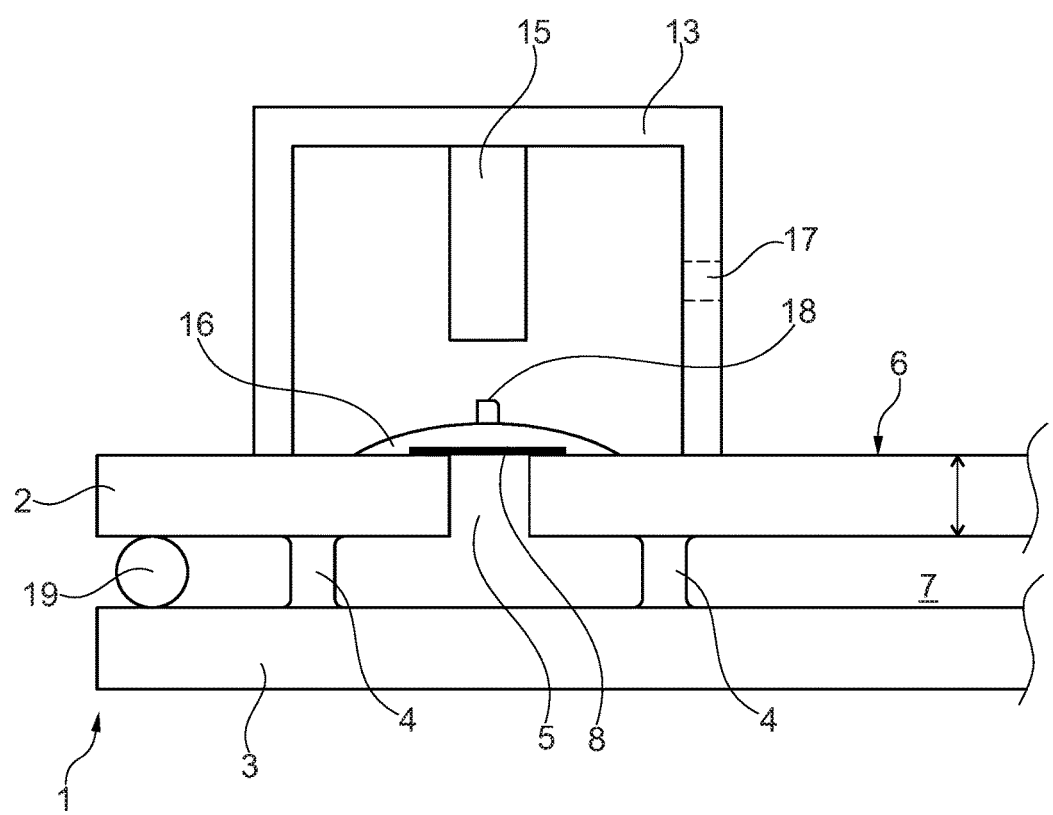
FIG. 4 is a cross-section of the example of FIGS. 2 and 3, wherein the evacuation tube has been heated so as to seal it off.

The evacuation tube 9 has typically a longitudinal extent of about 6 to 8 millimeters. The evacuation of the void 7 is by means of an evacuation head 13 as shown in FIGS. 2 to 4 which is arranged around the evacuation hole 5 in a gas tight manner, and the heating of the distal end 14 of the evacuation tube 9 in order to seal it after the evacuation of the void 7 is performed by means of a heating element 15 right above the distal end 14 of the evacuation tube 9. Alternatively or additionally microwaves or laser can be employed to seal the distal end 14 of the tube 9.

In a first step of the process as shown in FIG. 2, the supporting structure 8, the evacuation tube 9 and the tube soldering material 10 is situated on the upper surface 6 of the first pane 2 so that the supporting structure 8 rests on the upper surface 6 and the evacuation tube 9 is resting by its proximal end 11 on the supporting structure 8. The evacuation head 13 is situated on top of the upper surface 6 covering the evacuation hole 5 as well as the supporting structure 8, the evacuation tube 9 and the tube soldering material 10.

In the next step, the tube soldering material 10 is heated to a temperature, such as in the range of 300 to 450° to a state where it will flow and come into contact with the upper surface 6 of the first pane 2. The temperature is subsequently lowered until the tube soldering material 10 a solid condition so as to provide an gastight tube seal 16 as shown in FIG. 3 preventing passage of gas through the evacuation hole 5 except via the evacuation tube 9, and so that the tube seal 16 material bonds to the evacuation tube 9.

The heating of the tube soldering material 10 may be conducted by placing the VIG unit 1 in a furnace that heats up the entire unit 1 and thereby also the tube soldering material 10. Alternatively or additionally, the tube soldering material 10 may be heated by means of a source directed particularly to the tube soldering material 10, such as a laser beam, infrared radiation, microwave or induction heating.

The evacuation of the void 7 through the evacuation tube 9 is now effectuated via an evacuation port 17 in the evacuation head 13 until the required vacuum in the void has been reached, in the order of 0.001 millibar or even less. In order to provide a gas tight closing of the evacuation tube 9 and thereby of the void 7, the distal end 14 of the evacuation tube 9 is heated by means of the heating element 15 to a temperature, typically in the range of 700 to 1200° C., in particular about 950 to 1000° C. for a glass tube, so that the distal end 14 of the tube 9 will flow and form a closure 18 of the evacuation tube 9 as shown in FIG. 4, which is also known as the tip off of the evacuation tube 9.

The distance h between the heating element 15 and the distal end 14 of the evacuation tube 9 should be minimized in order to prevent the heat radiation from the heating element 15 from harming the tube seal 16, which may partly evaporate and/or become brittle or porous which may reduce the durability of the tube seal 16 and thus of the VIG unit 1 itself as the insulating properties of the VIG unit 1 depends on the state of vacuum in the void 7.

By providing the supporting structure 8 in a material that is shape-stable in the temperature range that the tube soldering material 10 must be heated to in order to flow are create the tube seal 16, the position of the distal end 14 of the evacuation tube 9 with respect to the upper surface 6 of the first pane 2 can be predetermined with a very high degree of precision, and the distance h between the heating element 15 and the distal end 14 of the evacuation tube 9 can be reduced to a range of 0.5 to 1 millimeters or even less, such as in the range of 0.1 to 0.5 millimeters.

The peripheral seal 19 provided between the two panes 2, 3 of tempered glass may be made from a soldering material containing glass solder frit with a low melting temperature, which by means of a thermal treatment is turned into a gas tight peripheral seal 19 as known from e.g. WO 02/27135 and EP 1 422 204. Alternatively, other materials may be employed, such as a metal band seal as disclosed e.g. in US 2015/218877.

In the example shown in FIGS. 2 to 4, the supporting structure 8 is depicted as a flat entity. However, in a second example of the disclosure shown in FIG. 5 the supporting structure 8 is provided with a first structure 20, which is suited for engaging with the edges at the upper surface 6 of the first pane 2 around the evacuation hole 5 so as to ensure a correct horizontal positioning of the supporting structure 8 with respect to the evacuation hole 5.

Figure 6:
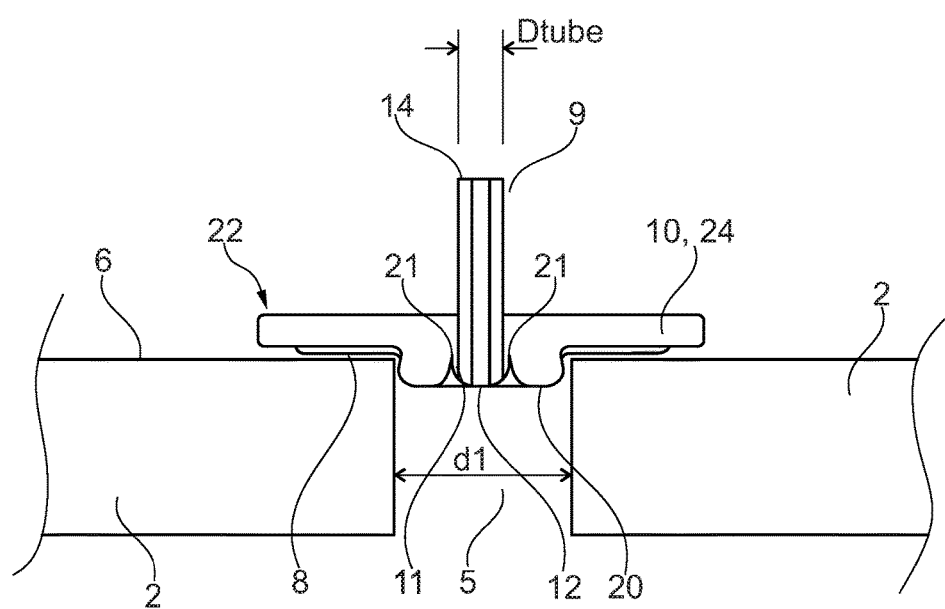
FIG. 6 is a cross-section of a third example of the disclosure, wherein the supporting structure is provided with a first structure and a second structure.

The supporting structure 8 may alternatively or additionally be provided with a second structure 21 as shown in FIG. 6 disclosing a third example of the disclosure, wherein the supporting structure 8 is provided with a first structure 20 as well as a second structure 21. The second structure is suited for engaging with the proximal end 11 of the evacuation tube 9, in particularly with the outer periphery of the evacuation tube 9 so as to ensure a correct horizontal positioning of the evacuation tube 9 with respect to the supporting structure 8. The second structure 21 is useful when providing the supporting structure 8, the evacuation tube 9 and the tube soldering material 10 to the first pane 2 as separate entities that are to be vertically aligned with each other as well as with the evacuation hole 5 or when producing a bonded assembly 22 of the three parts as discussed below.

Figure 7:
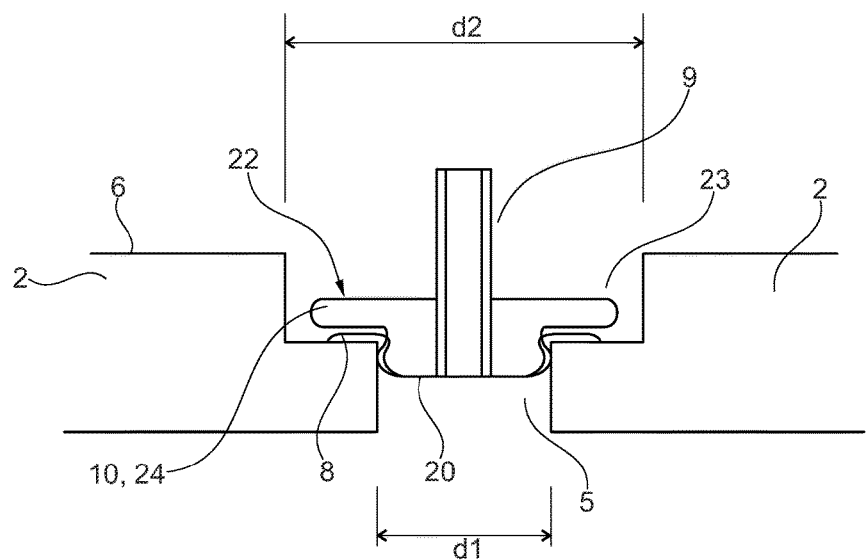
FIG. 7 is a cross-section of a fourth example of the disclosure, wherein the supporting structure is provided with a first structure and the supporting structure and the pre-form of tube soldering material are adapted to fit in a stepped evacuation hole.

A fourth example of the disclosure is shown in FIG. 7 for use in a stepped evacuation hole 5. The upper part 23 of the evacuation hole 5 nearest the upper surface 6 of the first pane 2 has a wider diameter d2 than the smallest diameter d1 of the evacuation hole 5 so as to be able to accommodate the pre-form 24 of tube soldering material 10. The supporting structure 8, the pre-form 24 and the evacuation tube 9 are provided as a bonded assembly 22 as discussed below with reference to FIGS. 14 to 16, but could alternatively be provided as separate items to the evacuation hole 5. By providing the stepped evacuation hole 5 in the first pane 2 it is possible to minimize the extent out from the upper surface 6 of the final sealing of the evacuation hole 5 as shown in FIG. 4 because the tube seal 16 and the tipped off evacuation tube 9 will be at least partly embedded in the upper part 23 of the evacuation hole 5 and thus make the sealing of the evacuation hole 5 less vulnerable to external impacts.

Figure 8:
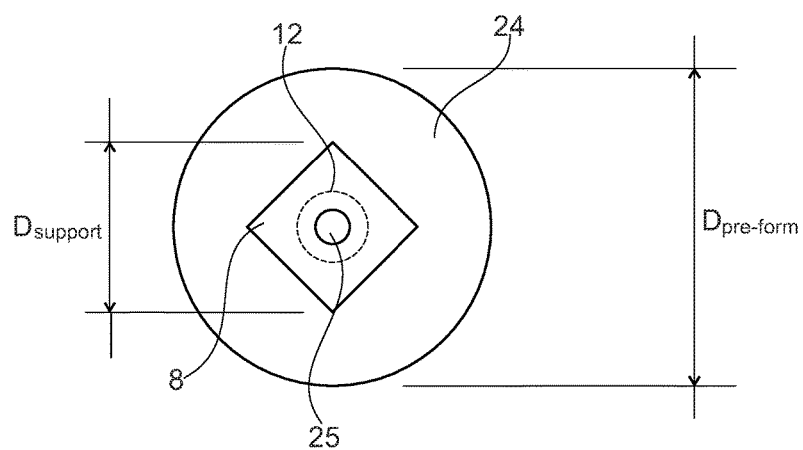
FIG. 8 is an end view of a first example of a supporting structure according to the disclosure.
Figure 9:
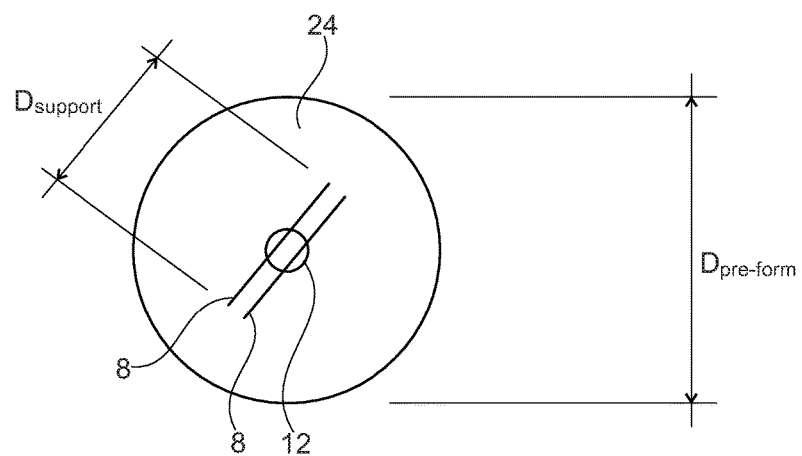
FIG. 9 is an end view of a second example of a supporting structure according to the disclosure.
Figure 10:
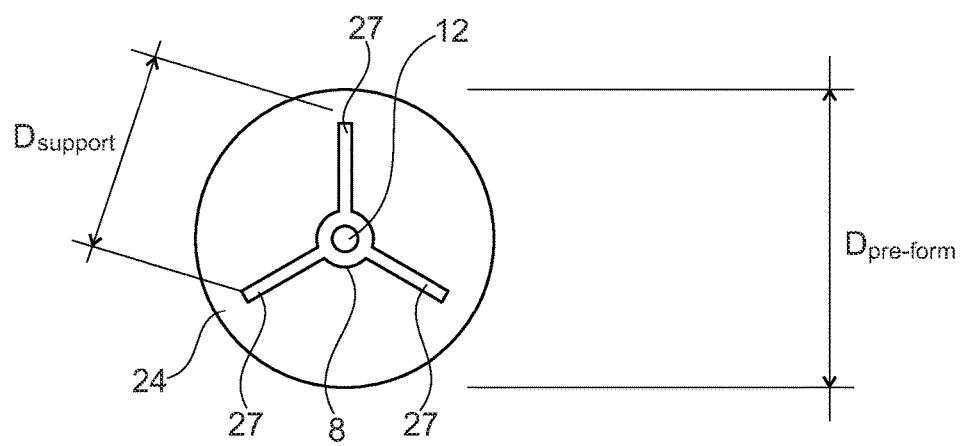
FIG. 10 is an end view of a third example of a supporting structure according to the disclosure.

The supporting structure 8 may take a variety of different forms, of which some examples are shown in end views in FIGS. 8, 9 and 10, i.e. shown from the lower end of an assembly 22 including a pre-form 24 of tube soldering material 10. The maximum outer diameter Dsupport of the supporting structure 8 should be sufficient to ensure that the supporting structure 8 will be able to rest on the first pane 2, i.e. the maximum outer diameter Dsupport should exceed at least the smallest internal diameter d1 of the evacuation hole 5, preferably by at least 1 to 2 millimeters. In the examples shown in FIGS. 8-10, the maximum outer diameter Dsupport is 5.6 millimeters, which is suitable for use with an evacuation hole 5 having a smallest internal diameter d1 of 4 millimeters. The pre-form 24 shown has an outer diameter Dpre-form of 12 millimeters.

In FIG. 8 is shown an end view of a first example of a supporting structure 8 according to the disclosure, where the supporting structure 8 is made from a 0.5 millimeters thick foil of titanium cut into a square form of a side length of 4 millimeters. The supporting structure 8 is provided with a central perforation 25 in order to allow for gas to flow from the evacuation hole 5 and to the interior of the evacuation tube 9. The outer contour of the evacuation tube 9 is indicated with a broken line in FIG. 8.

A second example of a supporting structure according to the disclosure is shown in FIG. 9, comprising two lengths 26 of nickel-plated copper wire. Copper has a suitable thermal expansion coefficient with respect to the one of the glass pane 2 and that of a tube seal 16 made from a tube soldering material containing glass solder frit, and the copper is plated with nickel in order to prevent a chemical reaction between the glass and the copper. An alternative to nickel-plated copper could be a suitable type of stainless steel.

In FIG. 10 an end view of a third example of a supporting structure according to the disclosure is shown, where the glass material of the evacuation tube 9 is fused with a glass supporting structure 8 having three tabs 27 so that the two are provided as a single unit made in the same material. Such a single unit may be manufactures as two parts that are fused together or it may be manufactured in one step, e.g. by molding in a suitable ceramic material.

Figure 11:
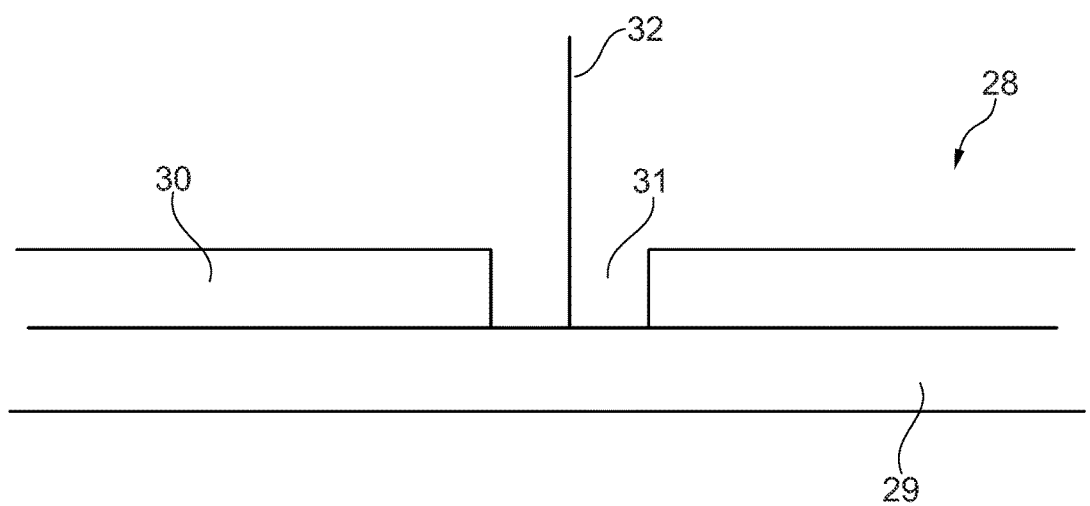
FIG. 11 is a cross-section of a first mold for preparing a bonded assembly according to the present disclosure.

FIG. 11 shows a first mold 28 for preparing a bonded assembly according to the present disclosure, comprising a bottom plate 29, an upper plate 30 having an opening 31 defined therein with a suitable diameter Dmould and a guide 32 arranged extending from the bottom plate 29 and through the opening 31, the guide having a size suitable for allowing an evacuation tube 9 to slide over the guide 32.

Figure 12:
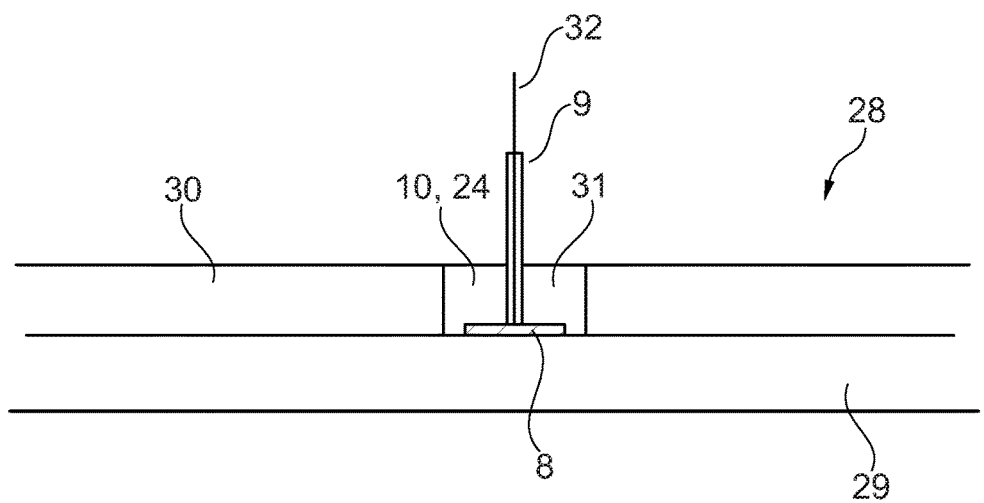
FIG. 12 is the mold of FIG. 11 with the assembly.

The mold 28 of FIG. 11 is shown in use in FIG. 12 with the assembly comprising a supporting structure 8, an evacuation tube 9 and tube soldering material in the form of a paste containing solder glass frit of about 70 wt %, an organic binder, inorganic fillers and solvents, for example water or alcohol based. The assembly 22 is heated to evaporate the solvents from the paste, which leaves a solid form disc of a tube soldering material 10 that binds to the supporting structure 8 as well as the evacuation tube 9 and a bonded assembly 22 is thus created. The assembly 22 may be heated further in order to perform a partially of substantially complete burn out of the binder material from the paste, so that the glass frit and the possible inorganic fillers are left or even further to a temperature, such as about 330° C., depending on the glass frit and the fillers, where the material sinters to form a more durable solid structure of the assembly 22. The aim of the heating is to create a bonded assembly 22 that is sufficiently durable to be removed from the mold 28 and be handled for arrangement on a first pane 2 on top of an evacuation hole 5. The type of bonded assembly 22 produced by means of a mold 22 as shown in FIG. 12 may be used as shown in FIG. 2.

The mold 28 of FIG. 11 may be filled with one type of paste or alternatively with two different types of paste, wherein the lower one comprises a glass solder frit with a thermal expansion coefficient to match the material of the upper pane 2 and an upper layer of a second type of paste comprising a glass solder frit with a second thermal expansion coefficient matching the material of the evacuation tube 9 similarly to what is disclosed in WO 00/41980.

Figure 13:
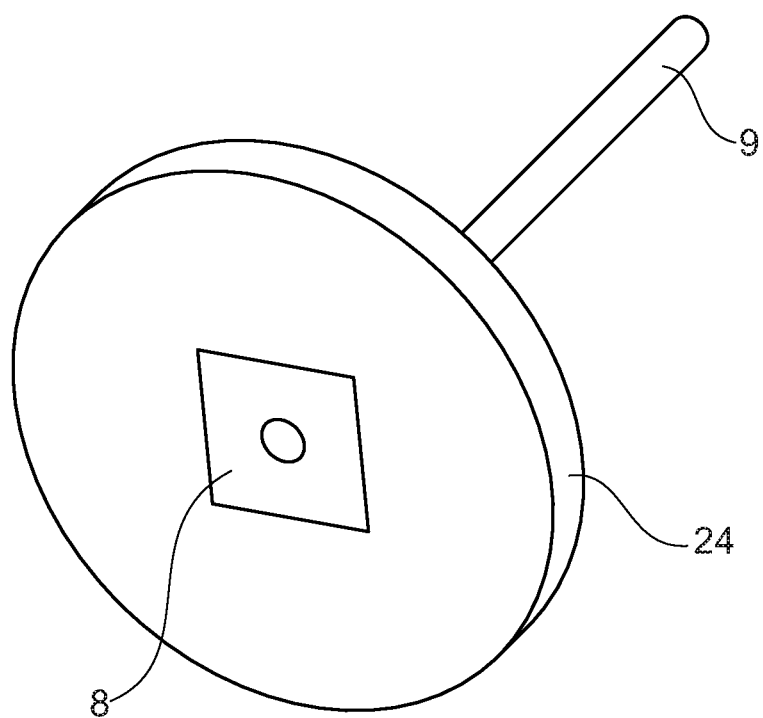
FIG. 13 is a perspective view of the assembly of FIG. 12.

FIG. 13 is a perspective view of the bonded assembly 22 of FIG. 12 when released from the mold 22.

Figure 14:
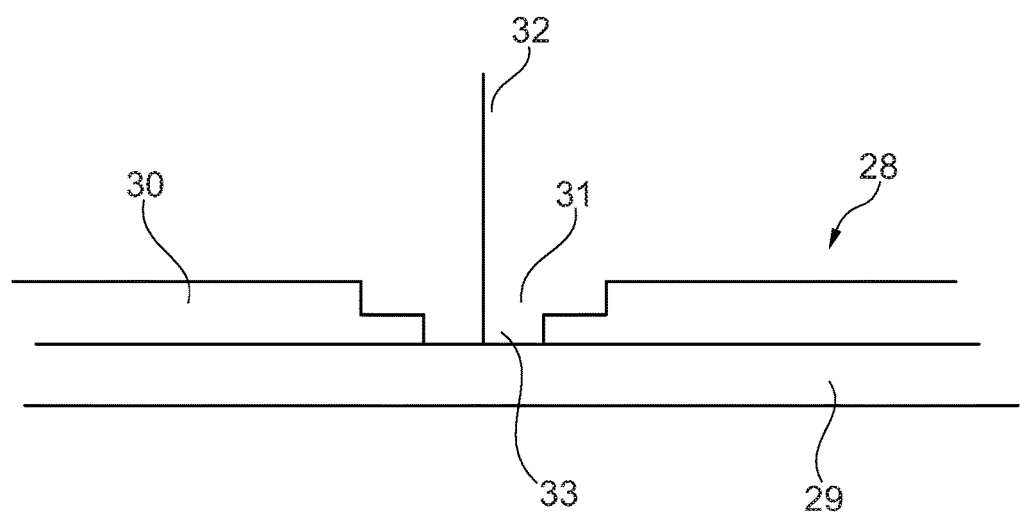
FIG. 14 is a cross-section of a second mold for preparing a bonded assembly according to the present disclosure.

A second type of mold 28 is shown in FIG. 14 comprising a bottom plate 29, an upper plate 30 having an upper opening 31 defined therein with a suitable diameter Dmould and a lower opening 33 defined therein. The lower opening 33 has a diameter Dlower which is smaller than the opening diameter Dmould of the upper opening 31. A guide 32 arranged extending from the bottom plate 29 and through the opening 31, 33, the guide having a size suitable for allowing an evacuation tube 9 to slide over the guide 32. The diameter Dlower of the lower opening 33 is similar to the smallest internal diameter d1 of the evacuation hole 5 in the VIG the assembly 22 is supposed to be used so that the assembly 22 will fit.

Figure 15:
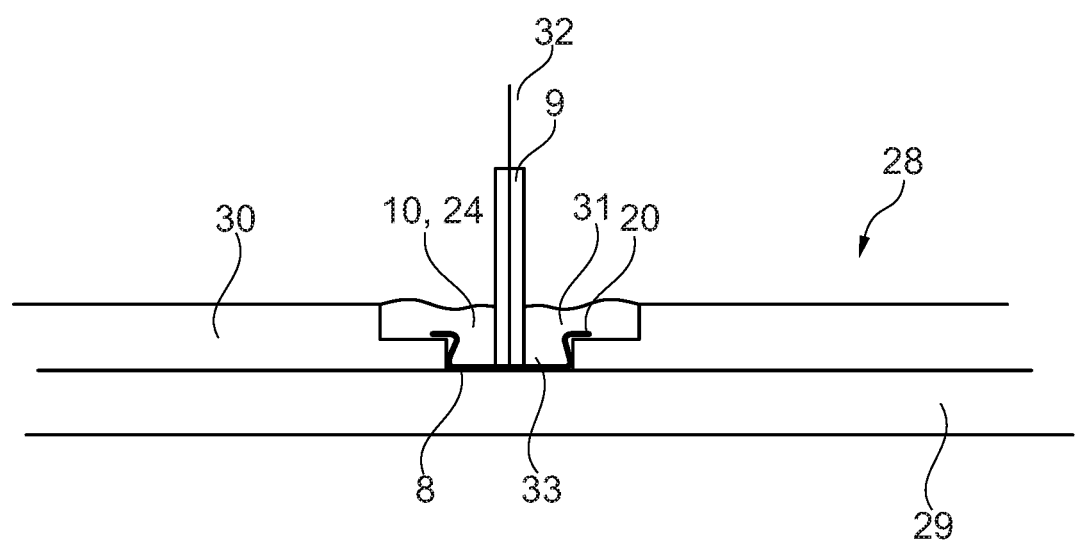
FIG. 15 is the mold of FIG. 14 with the assembly.

The mold 28 of FIG. 14 may be used similarly to the mold 28 shown in FIG. 11 as disclosed above with reference to FIG. 12. The mold 28 of FIG. 14 arranged with a supporting structure 8 comprising two lengths 26 of titanium wire, an evacuation tube 9 and tube soldering material 10 in the form of one or more pastes comprising glass solder frit is shown in FIG. 15. The supporting structure 8 is equipped with a first structure 20 as discussed previously to ensure a correct horizontal positioning of the assembly 22 with respect to the evacuation hole 5 of the upper pane 2 on which the assembly 22 is being applied, the first structure being in the form of bends in the wires 26. The mold 28 of FIG. 14 is used for producing a bonded assembly 22 as shown in FIG. 16.

Figure 5:
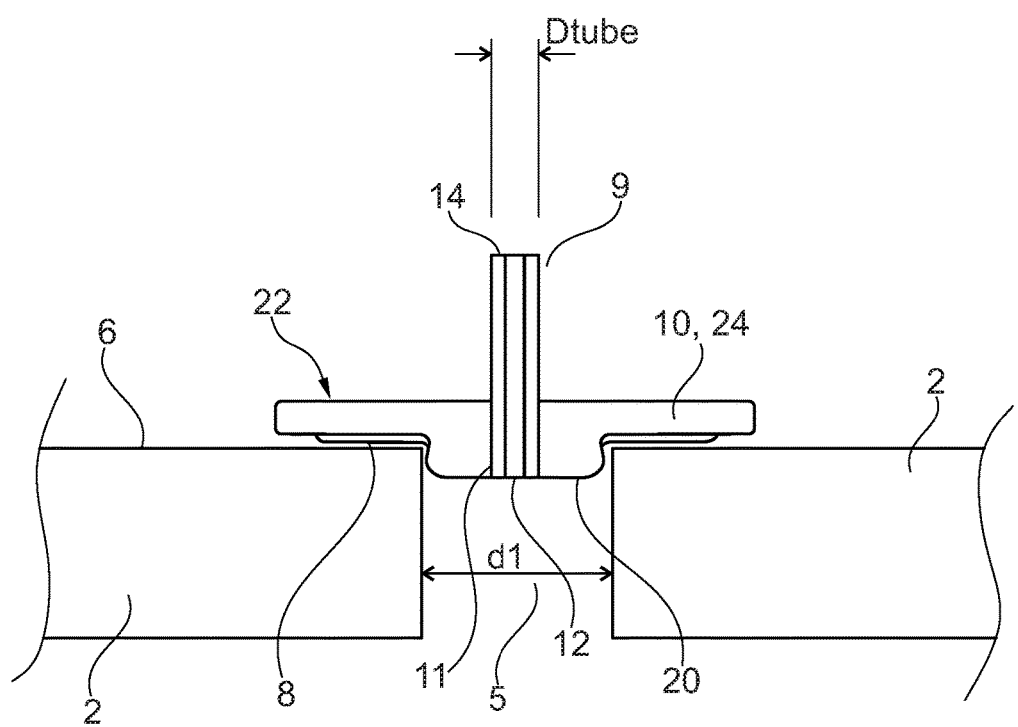
FIG. 5 is a cross-section of a second example of the disclosure, wherein the supporting structure is provided with a first structure.
Figure 16:
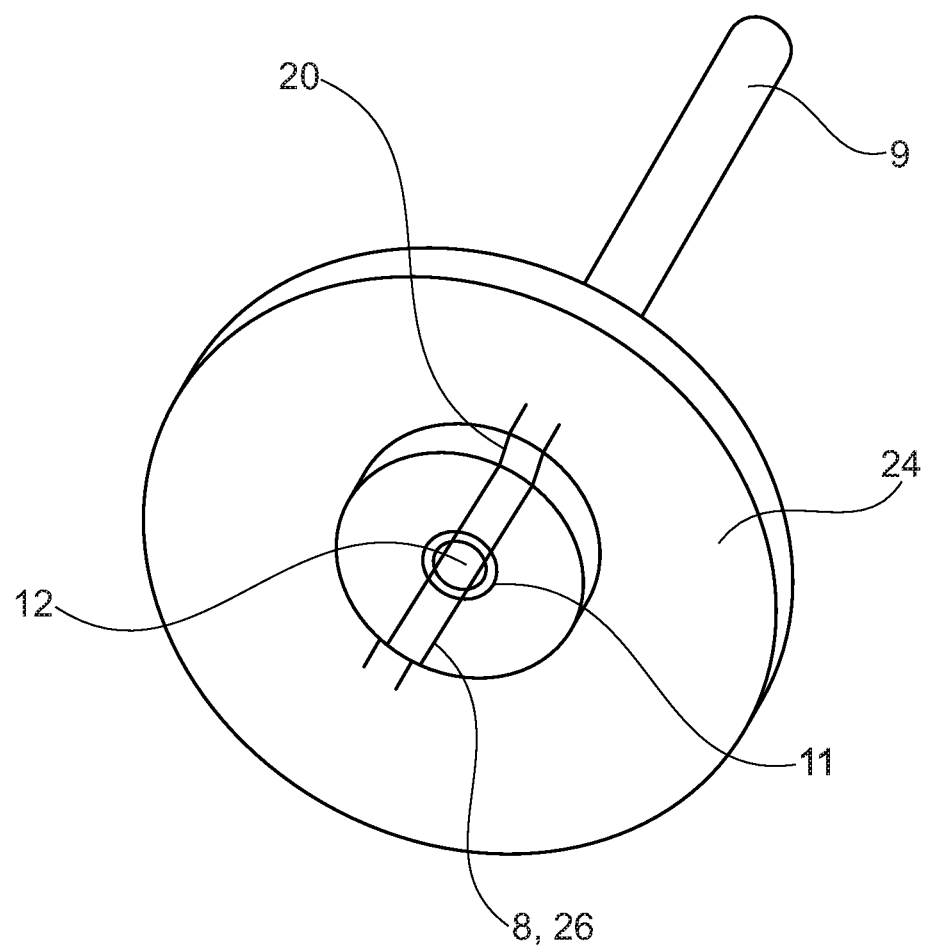
FIG. 16 is a perspective view of the assembly of FIG. 15.

The bonded assembly 22 of FIG. 16 may be used with an upper pane 2 of a VIG unit 1 as shown in FIG. 5, where the evacuation hole 5 has a constant diameter d1 or it may be used with an upper pane 2 with a stepped evacuation hole 5 as shown in FIG. 7.

Generally, the tube soldering material 10 may be a pre-form solid body 24 from solder glass frit, which for example is dried or heated (known as sinter) to form the solid body. The pre-form 24 rests on the supporting structure 8 which is shape-stable at the melting point of the pre-formed soldering material 10. Hereby an enhanced evacuation hole cover is provided with good positioning.

Optionally, the supporting structure 8 which is shape-stable at the melting point of the soldering material 10 may be joined to the pre-formed solid body of solder glass frit 24.

The supporting structure 8 can also support a getter material. Getter helps absorbing the impurities in the void and maintaining low pressure.

REFERENCE NUMERALS

1 Vacuum insulated glazing (VIG) unit
2 First panes of tempered glass
3 Second pane of tempered glass
4 Pillars
5 Evacuation hole
6 Upper surface of the first pane
7 Void formed between the two panes
8 Supporting structure
9 Evacuation tube
10 Tube soldering material
11 Proximal end of evacuation tube
12 Proximal opening of evacuation tube
13 Evacuation head
14 Distal end of the evacuation tube
15 Heating element
16 Tube seal
17 Evacuation port in evacuation head
18 Closure of evacuation tube
19 Peripheral seal
20 First structure of the supporting structure
21 Second structure of the supporting structure
22 Bonded assembly of supporting structure, evacuation tube and tube soldering material
23 Upper part of evacuation hole
24 Pre-form of tube soldering material
25 Perforation of supporting structure
26 Length of wire for supporting structure
27 Tabs of supporting structure
28 Mold for preparing a bonded assembly
29 Bottom plate of mold
30 Upper plate of mold
31 Opening in mold
32 Guide of mold
33 Lower opening in mold
Dtube Outer diameter of evacuation tube
Dsupport Maximum outer diameter of the supporting structure
Dpre-form Outer diameter of pre-form
Dmould Inner diameter of opening in mold
d1 Smallest internal diameter of the evacuation hole
d2 Diameter of upper part of evacuation hole
h Distance between the heating element and the distal end of the evacuation tube
t1 Thickness of first pane

The invention claimed is:

1. A method of producing a vacuum insulated glazing (VIG) unit comprising the steps of:
providing first and second substantially parallel panes of glass, a plurality of pillars, and a peripheral seal between the first and second panes;
providing an evacuation hole in an outer surface of the first pane for evacuating a void formed between said panes through the evacuation hole to a pressure less than atmospheric pressure;
providing on the first pane a supporting structure, an evacuation tube and a tube soldering material such that the supporting structure rests on the first pane and extends over the evacuation hole and a proximal end of the evacuation tube rests on the supporting structure so that a position of the evacuation tube in a direction perpendicular to an outer surface of the first pane is defined by the supporting structure and so that a proximal opening of the evacuation tube is in correspondence with the evacuation hole, the evacuation tube having an outer diameter which is less that a smallest internal diameter of the evacuation hole;
heating the tube soldering material to a condition where the tube soldering material will flow, while maintaining the evacuation tube, the supporting structure and the first glass pane substantially stationary,
subsequently cooling the tube soldering material to a solid condition so as to provide a gastight tube seal preventing passage of gas through the evacuation hole except via the evacuation tube, and so that a tube seal material bonds to the evacuation tube;
evacuating the void through the evacuation hole and the evacuation tube; and
heating a distal tip of the evacuation tube so as to seal the evacuation tube;
wherein the supporting structure is provided as shape-stable at a melting point of the tube seal material.

2. The method according to claim 1, wherein said first and second substantially parallel panes comprise tempered glass.

3. The method according to claim 1, wherein the supporting structure comprises a metal or a metal alloy.

4. The method according to claim 1, wherein the supporting structure comprises a first structure configured to engage with the evacuation hole so as to ensure a horizontal positioning of the supporting structure with respect to the evacuation hole.

5. The method according to claim 1, wherein the supporting structure is formed with a second structure which is configured to engage with the evacuation tube so as to ensure a horizontal positioning of the evacuation tube with respect to the supporting structure.

6. The method according to claim 1, wherein a thermal expansion coefficient of the supporting structure is substantially the same as a thermal expansion coefficient of the tube seal.

7. The method according to claim 1, wherein the thermal expansion coefficient of the supporting structure is substantially the same as a thermal expansion coefficient of the first pane.

8. The method according to claim 1, wherein the tube soldering material comprises a solid pre-form of glass solder frit with a central opening provided therein for accommodating the evacuation tube.

9. The method according to claim 1, wherein the evacuation tube and the supporting structure are integrally formed of a same material.

10. The method according to claim 1, wherein the tube soldering material comprises a low-melting temperature glass solder frit and is substantially lead-free.

* * * * *